US012021985B2

(12) United States Patent
Azouaoui et al.

(10) Patent No.: US 12,021,985 B2
(45) Date of Patent: Jun. 25, 2024

(54) MASKED DECOMPOSITION OF POLYNOMIALS FOR LATTICE-BASED CRYPTOGRAPHY

(71) Applicant: NXP B.V., Eindhoven (NL)

(72) Inventors: Melissa Azouaoui, Norderstedt (DE); Tobias Schneider, Graz (AT); Markus Schoenauer, Vienna (AT)

(73) Assignee: NXP B.V., Eindhoven (NL)

( * ) Notice: Subject to any disclaimer, the term of this patent is extended or adjusted under 35 U.S.C. 154(b) by 267 days.

(21) Appl. No.: 17/832,521

(22) Filed: Jun. 3, 2022

(65) Prior Publication Data

US 2023/0396436 A1 Dec. 7, 2023

(51) Int. Cl.
*H04L 9/30* (2006.01)
*G06F 7/487* (2006.01)
*G06F 7/72* (2006.01)

(52) U.S. Cl.
CPC .......... *H04L 9/3093* (2013.01); *G06F 7/4873* (2013.01); *G06F 7/727* (2013.01)

(58) Field of Classification Search
CPC ....... H04L 9/3093; G06F 7/4873; G06F 7/727
See application file for complete search history.

(56) References Cited

U.S. PATENT DOCUMENTS 11,496,297 B1 * 11/2022 Beckwith .............. H04L 9/3093
2020/0265167 A1 8/2020 Banerjee et al.
(Continued)

FOREIGN PATENT DOCUMENTS

CN 117764189 A * 3/2024 ............ H04L 9/003
FR 2926652 A1 1/2008
(Continued)

OTHER PUBLICATIONS https://github.com/pq-crystals/dilithium A reference C code is provided by the Dilithium team. Nov. 3, 2021.
(Continued)

*Primary Examiner* — Hee Soo Kim

(57) ABSTRACT

Various implementations relate to a data processing system comprising instructions embodied in a non-transitory computer readable medium, the instructions for a cryptographic operation including a masked decomposition of a polynomial a having $n_s$ arithmetic shares into a high part $a_1$ and a low part $a_0$ for lattice-based cryptography in a processor, the instructions, including: performing a rounded Euclidian division of the polynomial a by a base α to compute $t^{(\cdot)A}$; extracting Boolean shares $a_1^{(\cdot)B}$ from n low bits of t by performing an arithmetic share to Boolean share (A2B) conversion on $t^{(\cdot)A}$ and performing an AND with $\zeta-1$, where $\zeta=-\alpha^{-1}$ is a power of 2; unmasking $a_1$ by combining Boolean shares of $a_1^{(\cdot)B}$; calculating arithmetic shares $a_0^{(\cdot)A}$ of the low part $a_0$; and performing a cryptographic function using $a_1$ and $a_0^{(\cdot)A}$.

12 Claims, 1 Drawing Sheet

(56) References Cited

U.S. PATENT DOCUMENTS

| | | | | |
|---|---|---|---|---|
| 2020/0313886 | A1* | 10/2020 | Poeppelmann | H04L 9/3236 |
| 2022/0303133 | A1* | 9/2022 | Pessl | H04L 9/3234 |
| 2024/0113888 | A1* | 4/2024 | Pepin | H04L 9/3271 |

FOREIGN PATENT DOCUMENTS

| | | | | |
|---|---|---|---|---|
| FR | 3028368 A1 | | 11/2014 | |
| WO | WO-2020092257 A1 | * | 5/2020 | G06F 21/556 |
| WO | WO-2023232951 A1 | * | 12/2023 | |

OTHER PUBLICATIONS

Abdulrahman, Amin et al.; "Faster Kyber and Dilithium on the Cortex-M4"; IACR, International Association for ; Cryptologic Research; vol. 20220513:123335; May 13, 2022.

Rossi, Melissa; "Extended Security of Lattice-Based Cryptography"; Cryptography and Security [cs.CR]; Team CASCADE, Department of Computer Science of Paris, University PSL; Sep. 23, 2020.

L. Ducas, Eike Kiltz, Tancrède Lepoint, Vadim Lyubashevsky, P. Schwabe, Gregor Seiler, and D. Stehlé, Crystals-dilithium algorithm specifications and supporting documentation (version 3.1), 2021.

Daniel Heinz and Thomas Pöppelmann, Combined fault and dpa protection for lattice-based cryptography, Cryptology ePrint Archive, Report 2021/101, 2021, https://ia.cr/2021/101.

Vadim Lyubashevsky, Chris Peikert, and Oded Regev, On ideal lattices and leaming with errors over rings, Eurocrypt 2010 (Henri Gilbert, ed.), Springer Berlin Heidelberg, 2010, pp. 1-23.

National Institute of Standards and Technology, Post-quantum cryptography standardization, https://csrc.nist.gov/Projects/Post-Quantum-Cryptography/.

Oded Regev, On lattices, learning with errors, random linear codes, and cryptography, ACM Symposium on Theory of Computing 2005 (Harold N. Gabow and Ronald Fagin, eds.), ACM, 2005, pp. 84-93.

Shi Bai et al., CRYSTAL-Dilithium Algorithm Specifications and Supporting Documentation (Version 3.1), https://pq-crystals.org/dilithium/, Feb. 8, 2021.

* cited by examiner

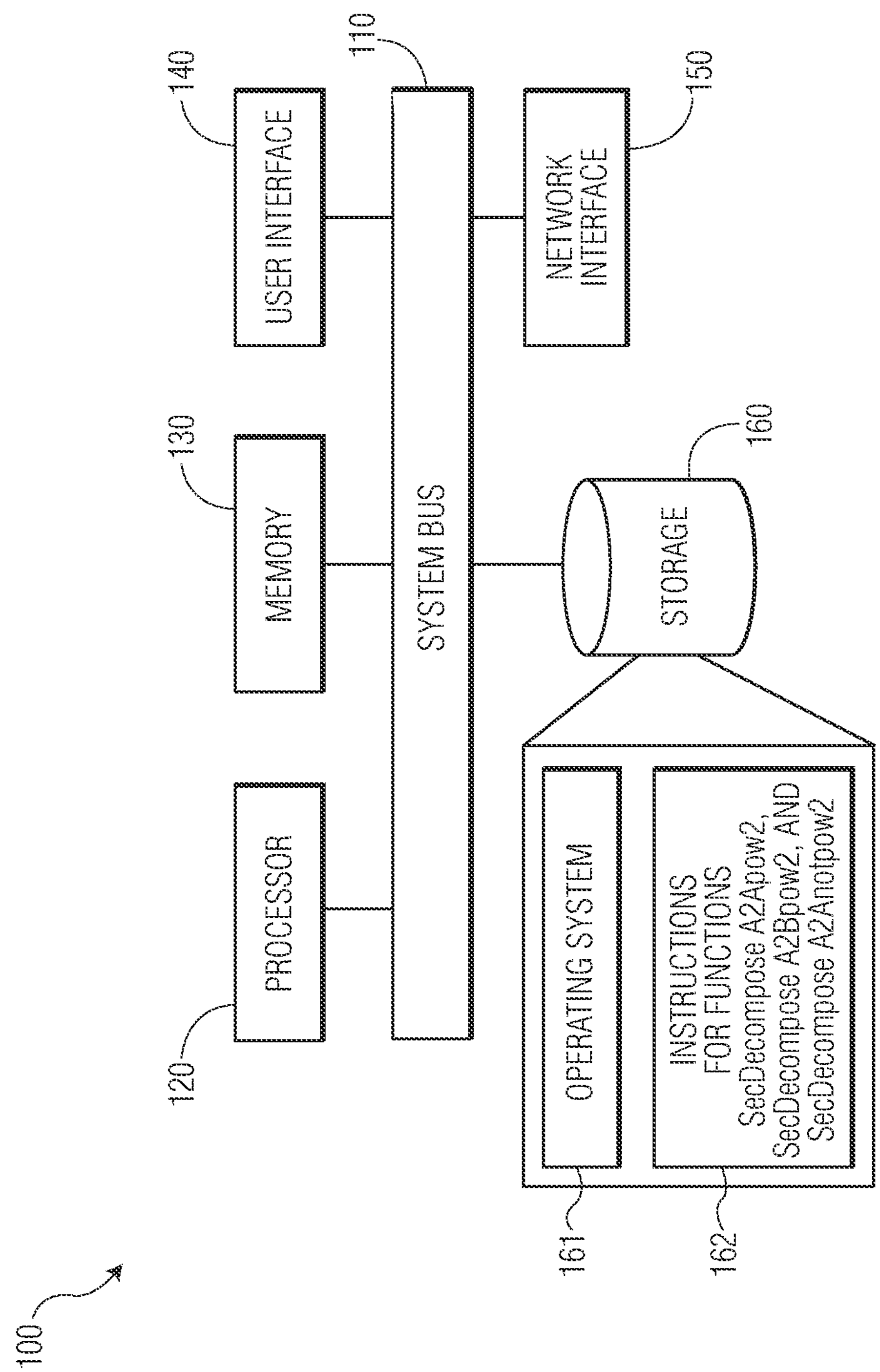
100
110
SYSTEM BUS
120
PROCESSOR
130
MEMORY
140
USER INTERFACE
150
NETWORK INTERFACE
160
STORAGE
161
OPERATING SYSTEM
162
INSTRUCTIONS FOR FUNCTIONS SecDecompose A2Apow2, SecDecompose A2Bpow2, AND SecDecompose A2Anotpow2

MASKED DECOMPOSITION OF POLYNOMIALS FOR LATTICE-BASED CRYPTOGRAPHY

TECHNICAL FIELD

Various exemplary embodiments disclosed herein relate generally to efficient and masked decomposition of polynomials for lattice-based cryptography.

Various exemplary embodiments disclosed herein relate generally to efficient and masked decomposition of polynomials for lattice-based cryptography.

BACKGROUND

Recent significant advances in quantum computing have accelerated the research into post-quantum cryptography schemes: cryptographic algorithms which run on classical computers but are believed to be still secure even when faced with an adversary with access to a quantum computer. This demand is driven by interest from standardization bodies, such as the call for proposals for new public-key cryptography standards by the National Institute of Standards and Technology (NIST). The selection procedure for this new cryptographic standard has started and has further accelerated the research of post-quantum cryptography schemes.

There are various families of problems to instantiate these post-quantum cryptographic approaches. Constructions based on the hardness of lattice problems are considered to be promising candidates to become the next standard. A subset of approaches considered within this family are instantiations of the Learning With Errors (LWE) framework: the Ring-Learning With Errors problem. One of the leading lattice-based signature schemes is Dilithium which requires operations involving arithmetic with polynomials with integer coefficients. When implemented, the main computationally expensive operations are the arithmetic with polynomials. More precisely, computations are done in a ring $R_q=(\mathbb{Z}/q\mathbb{Z})[X]/(F)$: the ring where polynomial coefficients are in $\mathbb{Z}/q\mathbb{Z}$ and the polynomial arithmetic is performed modulo a polynomial F.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a data processing system comprising instructions embodied in a non-transitory computer readable medium, the instructions for a cryptographic operation including a masked decomposition of a polynomial a having $n_s$ arithmetic shares into a high part $a_1$ and a low part $a_0$ for lattice-based cryptography in a processor, the instructions, including: performing a rounded Euclidian division of the polynomial a by a base $\alpha$ to compute $t^{(\cdot)A}$; extracting Boolean shares $a_1^{(\cdot)B}$ from n low bits of t by performing an arithmetic share to Boolean share (A2B) conversion on $t^{(\cdot)A}$ and performing an AND with $\zeta-1$, where $\zeta=-\alpha^{-1}$ is a power of 2; unmasking $a_1$ by combining Boolean shares of $a_1^{(\cdot)B}$; calculating arithmetic shares $a_0^{(\cdot)A}$ of the low part $a_0$; and performing a cryptographic function using $a_1$ and $a_0^{(\cdot)A}$.

Various embodiments are described, wherein performing a rounded Euclidian division of the polynomial a by a base $\alpha$ to compute $t^{(\cdot)A}$ includes adding $\alpha/2$ to $a^{(\cdot)A}$ and dividing by $\alpha$.

Various embodiments are described, wherein performing a rounded Euclidian division of the polynomial a by a base $\alpha$ to compute $t^{(\cdot)A}$ includes calculating: $t^{(\cdot)A}=a^{(\cdot)A}+\gamma$; and $t^{(\cdot)A}=\alpha^{-1}\times t^{(\cdot)A}-(q \bmod \zeta)$, where $\gamma=\alpha/2$ and q is a prime modulus.

Various embodiments are described, wherein calculating arithmetic shares $a_0^{(\cdot)A}$ of the low part $a_0$ includes: calculating $u^{(\cdot)A}$ by subtracting $a_1$ from $t^{(\cdot)A}$ and adding q mod $\zeta$, where q is a prime modulus; and multiplying $u^{(\cdot)A}$ by $\alpha$ and then subtracting $\alpha/2$.

Further various embodiments relate to a data processing system comprising instructions embodied in a non-transitory computer readable medium, the instructions for a cryptographic operation including a masked decomposition of a polynomial a having $n_s$ arithmetic shares into a high part $a_1$ and a low part $a_0$ for lattice-based cryptography in a processor, the instructions, including: performing a rounded Euclidian division of the polynomial a by a base $\alpha$ to compute $t^{(\cdot)A}$; extracting Boolean shares $a_1^{(\cdot)B}$ from n low bits of t by performing an arithmetic share to Boolean share (A2B) conversion on $t^{(\cdot)A}$ and performing an AND with $\zeta-1$, where $\zeta=-\alpha^{-1}$ is a power of 2; unmasking $a_1$ by combining Boolean shares of $a_1^{(\cdot)B}$; calculating the Boolean shares $a_0^{(\cdot)B}$ of the low part $a_0$; and performing a cryptographic function using $a_1$ and $a_0^{(\cdot)B}$.

Various embodiments are described, wherein performing a rounded Euclidian division of the polynomial a by a base $\alpha$ to compute $t^{(\cdot)A}$ includes adding $\alpha/2$ to $a^{(\cdot)A}$ and dividing by $\alpha$.

Various embodiments are described, wherein performing a rounded Euclidian division of the polynomial a by a base $\alpha$ to compute $t^{(\cdot)A}$ includes calculating: $t^{(\cdot)A}=a^{(\cdot)A}+\gamma$; and $t^{(\cdot)A}=\alpha^{-1}\times t^{(\cdot)A}-(q \bmod \zeta)$, where $\gamma=\alpha/2$ and q is a prime modulus.

Various embodiments are described, wherein calculating the Boolean shares $a_0^{(\cdot)B}$ of the low part $a_0$ includes: shifting $t^{(\cdot)B}$ n bits to the right, where n is a number of bits in $\zeta$; and calculating $a_0^{(\cdot)B}=\mathrm{SecAdd}(((\gamma+(q \bmod \zeta))^{(\cdot)B}, \neg t^{(\cdot)B})$ where $\gamma=\alpha/2$ and q is a prime modulus.

Further various embodiments relate to a data processing system comprising instructions embodied in a non-transitory computer readable medium, the instructions for a cryptographic operation including a masked decomposition of a polynomial a having $n_s$ arithmetic shares into a high part $a_1$ and a low part $a_0$ for lattice-based cryptography in a processor, the instructions, including: performing a rounded Euclidian division of the polynomial a by a base $\alpha$ to compute $t^{(\cdot)A}$; extracting Boolean shares $a_1^{(\cdot)B}$ from n low bits of t by performing an arithmetic share to Boolean share (A2B) conversion on $t^{(\cdot)A}$ to produce $t^{(\cdot)B}$ and performing a Boolean share to arithmetic share (B2A) conversion on $t^{(\cdot)B}$, where $\zeta=-\alpha^{-1}$; unmasking $a_1$ by combining arithmetic shares of $a_1^{(\cdot)A}$; calculating the arithmetic shares $a_0^{(\cdot)A}$ of the low part $a_0$; and performing a cryptographic function using $a_1$ and $a_0^{(\cdot)A}$.

Various embodiments are described, wherein performing a rounded Euclidian division of the polynomial a by a base $\alpha$ to compute $t^{(\cdot)A}$ includes adding $\alpha/2$ to $a^{(\cdot)A}$ and dividing by $\alpha$.

Various embodiments are described, wherein performing a rounded Euclidian division of the polynomial a by a base $\alpha$ to compute $t^{(\cdot)A}$ includes calculating: $t^{(\cdot)A}=a^{(\cdot)A}+\gamma$; and $t^{(\cdot)A}=\alpha^{-1}\times t^{(\cdot)A}-(q \bmod \zeta)$, where $\gamma=\alpha/2$ and q is a prime modulus.

Various embodiments are described, wherein calculating the arithmetic shares $a_0^{(\cdot)A}$ of the low part $a_0$ includes: calculating $u^{(\cdot)A}$ by subtracting $a_1$ from $t^{(\cdot)A}$ and adding q mod $\zeta$, where q is a prime modulus; and multiplying $u^{(\cdot)A}$ by $\alpha$ and then subtracting $\alpha/2$.

BRIEF DESCRIPTION OF THE DRAWINGS

In order to better understand various exemplary embodiments, reference is made to the accompanying drawings, wherein:

FIG. 1 constitutes, in some respects, an abstraction and that the actual organization of the components of the device may be more complex than illustrated.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Some post-quantum cryptography schemes require a decomposition or a truncation-like operation of polynomial coefficients. For unprotected implementations, this can be straightforwardly realized via different algorithms, mainly involving an Euclidean division or a simple truncation for power of two base and modulus. One family of attacks, so-called side-channel analysis, exploits data dependencies in physical measurements of the target device (e.g., power consumption) to recover secret keys and can be thwarted with the help of masking the processed data. The decomposition operation requires protection since its input and outputs depend on the secret key. However, previous or straightforward techniques for masked decomposition introduce a significant performance overhead for non power of two base and modulus. In this disclosure, a new approach is presented to perform masked decomposition securely and efficiently for non power of 2 moduli.

The signing operation of a digital signature scheme generates a signature for a given message using a secret key. If this secret key was to be leaked, it would invalidate the security properties provided by the scheme. It has been shown that unprotected implementations of post-quantum signature schemes are vulnerable to implementation attacks, e.g., side-channel analysis. In particular, it was demonstrated that the secret key may be extracted from physical measurements of key-dependent parts in the signing operation.

For Dilithium, the key-dependent operations include the decomposition of polynomials in a base $\alpha$. Concretely, for a coefficient $a\in \mathbb{Z}/q\mathbb{Z}$, the decompose operation computes the high part $a_1$ and the low part $a_0$ such that a mod $$q = a_1 \times \alpha + a_0 \text{ with } -\frac{\alpha}{2} < a_0 \leq \frac{\alpha}{2},$$

except if $$a_1 = \frac{q-1}{\alpha}$$

where $a_1$ is set to 0 and $a_0=(a \bmod q)-q$, with $$-\frac{\alpha}{2} \leq a_0 < 0.$$

The possible values for the decomposition base $\alpha$ are $$\frac{q-1}{16} \text{ and } \frac{q-1}{44}.$$

Additionally, the parameter $\gamma$ is defined such that $\alpha=2\gamma$. While the decomposition operation is trivial in the unmasked case, a secure implementation of this digital signature scheme requires the integration of dedicated countermeasures for this step.

Masking is a common countermeasure to thwart side-channel analysis and has been utilized for various applications. Besides security, efficiency is also an important aspect when designing a masked algorithm. Important metrics for software implementations of masking are the number of operations and the number of fresh random elements required for the masking scheme.

The first masking approach for Dilithium was proposed in Vincent Migliore, Benoît Gérard, Mehdi Tibouchi, and Pierre-Alain Fouque, Masking dilithium-efficient implementation and side-channel evaluation, Applied Cryptography and Network Security—17th International Conference, ACNS 2019, Bogota, Colombia, Jun. 5-7, 2019, Proceedings (Robert H. Deng, Valérie Gauthier-Umaña, hoa, and Moti Yung, eds.), Lecture Notes in Computer Science, vol. 11464, Springer, 2019, pp. 344-362 (Migliore). In Migliore, the decomposition operation for prime modulus is performed using multiple arithmetic additions modulus q over Boolean shares. It takes as input an arithmetic sharing of coefficients and produces Boolean-shared decompositions.

Similar lattice-based signature schemes to Dilithium include GLP and qTESLA. The first dedicated masking of GLP was presented in Gilles Barthe, Sonia Belaïd, Thomas Espitau, Pierre-Alain Fouque, Benjamin Grégoire, Mélissa Rossi, and Mehdi Tibouchi, Masking the GLP lattice-based signature scheme at any order, Advances in Cryptology—EUROCRYPT 2018—37th Annual International Conference on the Theory and Applications of Cryptographic Techniques, Tel Aviv, Israel, Apr. 29-May 3, 2018 Proceedings, Part II (Jesper Buus Nielsen and Vincent Rijmen, eds.), Lecture Notes in Computer Science, vol. 10821, Springer, 2018, pp. 354-384 (Barthe). GLP does not require a decomposition operation similar to the one needed for Dilithium. qTESLA only requires a rounding operation by a power of 2. In François Gérard and Mélissa Rossi, An efficient and provable masked implementation of qtesla, Smart Card Research and Advanced Applications—18th International Conference, CARDIS 2019, Prague, Czech Republic, Nov. 11-13, 2019, Revised (Sonia Belaïd and Tim Güneysu, eds.), Lecture Notes in Computer Science, vol. 11833, Springer, 2019, pp. 74-91 (Gérard), the authors extend on Barthe to mask the signature scheme qTESLA, but modify the original parameters of the scheme by changing the prime modulus to a power of two for simpler masking of the rounding operation.

Decomposition methods are disclosed herein that improves on the state-of-the-art enabling significantly more efficient implementations of post quantum cryptography (PQC) schemes requiring a decomposition operation with non power of 2 moduli. An example of such a PQC scheme is Dilithium that includes the decomposition of secret polynomial coefficients by the base α. The decomposition methods disclosed herein improves both the number of operations and the number of random elements required.

SecDecomposeOriginal (or Algorithm 12 Decompose in Migliore where the name is adapted for better readability) computes $a_0$ first as the division remainder of a by α and then ensures that $a_0$ is in the required range by the Decompose function specifications. The next step of SecDecomposeOriginal is to compute $a_1$ as $$\frac{(a - a_0)}{\alpha}.$$

The last step of the algorithm is to evaluate the specific case where $a-a_0=q-1$. SecDecomposeOriginal begins by converting the input from arithmetic to Boolean shares and then exclusively operates on the Boolean shares.

SecDecomposeOriginal includes the following drawbacks. First, because the output $a_0$ of the decomposition function is the input to an addition, an implementation of Dilithium using SecDecomposeOriginal requires an additional B2A conversion in order to perform the addition efficiently or alternatively performs this addition on Boolean shares. Both options are not efficient because both a B2A conversion and an addition on Boolean shares are expensive operations. Second, in SecDecomposeOriginal the computation of $a_0$ and $a_1$ requires many calls to SecAdd (i.e., arithmetic addition over Boolean shares) which is a particularly expensive operation on Boolean shares. Third, in SecDecomposeOriginal almost half of the operations are used only to ensure the range on $a_0$ and to cater to the specific case where $a-a_0=q-1$ (in particular this part of the algorithm includes one call to SecAnd and two calls to SecAdd).

As a result, for NIST level 5 for one Dilithium signing iteration and d=5, SecDecomposeOriginal takes about 24.2 million operations and 100.3 million random bits. The proposed SecDecomposeA2Apow2 takes 8 million operations and 38 million random bits for the same task. For NIST level 3 taking into account the average number of signing iterations (=5.1) and for d=5, SecDecomposeOriginal takes 92.6 million operations and 383.9 million random bits. The proposed SecDecomposeA2Apow2 requires only 30.8 million operations and 145.3 million random bits in comparison.

The functions SecDecomposeA2Apow2 and SecDecomposeA2Bpow2 provide efficient decomposition when the opposite of the base's inverse is a power of two. The first function SecDecomposeA2Apow2 circumvents the first drawback of SecDecomposeOriginal by providing $a_0$ in arithmetic shares. The second function SecDecomposeA2Bpow2 provides a more efficient approach to SecDecomposeOriginal while still outputting a Boolean-shared $a_0$, when this is needed for certain implementations. The function SecDecomposeA2Anotpow2 provides an efficient alternative for arbitrary decomposition bases (when the opposite of the base's inverse is not a power of 2). All the functions make use of the observation that once $a_1$ is computed, $a_1$ may be unmasked because its value may be easily recovered from a public signature and the public key.

The improvements of the decomposition functions disclosed herein are based on computing $a_1$ first using a rounded up division by α. As opposed to SecDecomposeOriginal, which operates only on Boolean shares, this is efficiently performed on the input arithmetic shares of a by adding $$\gamma = \frac{\alpha}{2}$$

and multiplying by the inverse of α modulus q. This allows for a conversion to Boolean shares much later and only when necessary.

The disclosed decomposition functions with rounded division also allows for the computation of the value of $a_1$ that does not require any corner case evaluation/correction and also results implicitly in the correct range for $a_0$ when it is computed from a and the computed $a_1$. Functions SecDecomposeA2Apow2 and SecDecomposeA2Bpow2 require one A2B conversion to perform the following Λ operation efficiently. SecDecomposeA2Apow2 does not require any other expensive operation on arithmetic or Boolean shares. SecDecomposeA2Bpow2 requires a single addition on Boolean shares. SecDecomposeA2Anotpow2 performs an efficient decomposition for non power of 2 base and uses one A2B conversion and one B2A conversion.

The disclosed decomposition functions may be applied for arbitrary non power of 2 moduli q and arbitrary decomposition base α. Multiple decomposition function versions are provided: namely when $-\alpha^{-1}$ is a power of two and when it is not. All masked operations on arithmetic shares are naturally performed modulus q. The annotation mod q shows where a modular reduction has to be performed for the unmasked versions of the algorithms. If an operation is not annotated, the reduction is either explicit or not required.

An application of the disclosed decomposition functions may include the signing process of Dilithium where the coefficients of a secret vector w are decomposed. Concretely, each coefficient $a \in \mathbb{Z}/q\mathbb{Z}$ (with $q=2^{23}-2^{13}+1$) of w is decomposed into its high and low parts $a_1$ and $a_0$ such that $a=a_1 \times \alpha + a_0$. The values of $a_1$ and $a_0$ are such that $$-\frac{\alpha}{2} < a_0 \leq \frac{\alpha}{2},$$

except if $$a_1 = \frac{q-1}{\alpha}$$

where $a_1$ is set to 0 and $a_0=(a \bmod q)-q$, with $$-\frac{\alpha}{2} \le a_0 < 0.$$

The possible values for the decomposition base $\alpha$ are $$\frac{q-1}{16} \text{ and } \frac{q-1}{44}.$$

Additionally, the parameter $\gamma$ is defined such that $\alpha=2\gamma$.

The coefficients of w must remain secret to ensure the security of the signature scheme. A common approach is to split up the sensitive values into Boolean or arithmetic shares. A Boolean or arithmetically masked variable x as $x^{(\cdot)B}$ or $x^{(\cdot)A}$ may be denoted respectively, with $\oplus_{i=0}^{n_s-1} x^{(i)B}=x$ or $\Sigma_{i=0}^{n_s-1} x^{(i)A}=x \bmod q$ respectively, ($n_s$ being the number of shares). Also note that for protected implementations, the input to the decomposition function is arithmetically shared (because it is the output of a multiplication).

The new disclosed decomposition functions SecDecomposeA2Apow2, SecDecomposeA2Bpow2, and SecDecomposeA2Anotpow2 will now be described.

The function SecDecomposeA2Apow2 is dedicated to the case where $\zeta=-\alpha^{-1}$ is a power of 2. Let n be the number of bits in $\zeta$. Below pseudocode is used to describe SecDecomposeA2Apow2. SecDecomposeA2Apow2 outputs $a_0$ in arithmetic shares and $a_1$ is unshared. The first step of SecDecomposeA2Apow2 is to compute $a_1$ as the rounded Euclidean division of a by $\alpha$ as illustrated in Lines 1-2. The rounding is done to the nearest integer. This is achieved by first adding $$\frac{\alpha}{2} = \gamma$$

in Line 1 and then dividing by $\alpha$ in Line 2. Because the operations are performed on arithmetic shares modulus q the division by a may be performed very efficiently by multiplying with its multiplicative inverse $\alpha^{-1}$ modulus q. Then, $a_1$ is extracted by $\alpha^{-1}\times t=\alpha^{-1}\times(\alpha\times a_1+a_0+\gamma)=a_1+\zeta(-a_0-\gamma)$. Then before extracting $a_1$ from $\alpha^{-1}\times t$ as the n low order bits in Line 2, the low order bits of q need to be accounted for because the positive representation of $a_1+\zeta(-a_0-\gamma)$ is $q+a_1+\zeta(-a_0-\gamma)$. The influence of the n low order bits of q are removed by subtracting q mod $\zeta$ at Line 2. Then, $a_1$ is extracted as the n low bits of t by performing an A2B conversion at Line 3, an AND with $\zeta-1$ at Line 4, and unmasking $a_1$ at Line 5 by recombining the Boolean shares. Next, at Line 6, u is computed by subtracting $a_1$ and undoing the subtraction of q mod $\zeta$, i.e.:

$$u=t-a_1+(q \bmod \zeta)=a_1+\alpha^{-1}\times(a_0+\gamma)-1-a_1+1=-16\times(a_0+\gamma). \quad (1)$$

Lines 7 and 8 involve dividing u by $\alpha^{-1}$ which is equivalent to multiplying by $\alpha$, then subtracting $\gamma$ to recover $a_0$.

Function SecDecomposeA2Apow2($a^{(\cdot)A}$)

Input: An arithmetic sharing $a^{(\cdot)A}$ of a coefficient.
Output: A decomposition $a_1$, $a_0^{(\cdot)A}$ of $a^{(\cdot)A}$.
1: $t^{(\cdot)A} = a^{(\cdot)A} + \gamma$
2: $t^{(\cdot)A} = a^{-1} \times t^{(\cdot)A} - (q \bmod \zeta)$ ▷mod q
3: $t^{(\cdot)B} = \text{A2B}(t^{(\cdot)A})$
4: $a_1^{(\cdot)B} = t^{(\cdot)B} \wedge (\zeta - 1)$
5: $a_1 = \oplus_{i=0}^{n_s-1} a_1^{(i)B}$ ▷unmasking of $a_1$
6: $u^{(\cdot)A} = t^{(\cdot)A} - a_1 + (q \bmod \zeta)$
7: $u^{(\cdot)A} = a \times u^{(\cdot)A}$ ▷mod q
8: $a_0^{(\cdot)A} = u^{(\cdot)A} - \gamma$
9: return $a_1$, $a_0^{(\cdot)A}$ A function SecDecomposeA2Bpow2 illustrated in pseudocode below presents an alternative to the SecDecomposeA2Apow2 function when Boolean shares are required for the masking of $a_0$. $a_1$ is unshared as in the SecDecomposeA2Apow2 function. First, the same rounded to nearest integer Euclidean division as in the SecDecomposeA2Apow2 function is used to extract $a_1$ at Lines 1-5. Then all the previous operations performed on the arithmetic shares are replaced by Boolean operations that essentially perform the same operations. First, instead of subtracting $(a_1-1)$ and multiplying by a (SecDecomposeA2Apow2, Lines 6-7), instead t is shifted by n bits to the right at line 6 that is equivalent to dividing by $\zeta$ or multiplying by $\alpha$. Finally, the subtraction $\gamma$–t is performed at Line 7 using t's two's complement.

Function SecDecomposeA2Bpow2($a^{(\cdot)A}$)

Input: An arithmetic sharing $a^{(\cdot)A}$ of a coefficient.
Output: A Boolean decomposition $a_1$, $a_0^{(\cdot)B}$ of $a^{(\cdot)A}$.
1: $t^{(\cdot)A} = a^{(\cdot)A} + \gamma$
2: $t^{(\cdot)A} = a^{-1} \times t^{(\cdot)A} - (q \bmod \zeta)$ ▷mod q
3: $t^{(\cdot)B} = \text{A2B}(t^{(\cdot)A})$
4: $a_1^{(\cdot)B} = t^{(\cdot)B} \wedge (\zeta - 1)$
5: $a_1 = \oplus_{i=0}^{n_s-1} a_1^{(i)B}$ ▷unmasking of $a_1$
6: $t^{(\cdot)B} = t^{(\cdot)B} >> n$
7: $a_0^{(\cdot)B} = \text{SecAdd}(((\gamma + (q \bmod \zeta))^{(\cdot)B}, \neg t^{(\cdot)B})$
8: return $a_1$, $a_0^{(\cdot)B}$ A function SecDecomposeA2Anotpow2 is directed to cases where $\zeta$ is not a power of 2. It essentially performs the same operations as SecDecomposeA2Apow2. However, in this case, the AND on Line 4 in SecDecomposeA2Apow2 cannot be performed to extract the bits of $a_1$ because $\zeta$ is not a power of 2. Instead, a modular reduction using a B2A conversion modulus $\zeta$ is performed. At Line 4 $a_1^{(\cdot)A}$ is extracted from $t^{(\cdot)B}$ using a B2A function. Then at Line 5 $a_1$ is unmasked. Then Lines 6-9 are identical to those in SecDecomposeA2Apow2.

Function SecDecomposeA2Anotpow2($a^{(\cdot)A}$)

Input: An arithmetic sharing $a^{(\cdot)A}$ of a coefficient.
Output: A decomposition $a_1$, $a_0^{(\cdot)A}$ of $a^{(\cdot)A}$.
1: $t^{(\cdot)A} = a^{(\cdot)A} + \gamma$
2: $t^{(\cdot)A} = a^{-1} \times t^{(\cdot)A} - (q \bmod \zeta)$ ▷mod q
3: $t^{(\cdot)B} = \text{A2B}(t^{(\cdot)A})$
4: $a_1^{(\cdot)A} = \text{B2A}_\zeta(t^{(\cdot)B})$
5: $a_1 = \Sigma_{i=0}^{n_s-1} a_1^{(i)A} \bmod q$ ▷unmasking of $a_1$
6: $u^{(\cdot)A} = t^{(\cdot)A} - a_1 + (q \bmod \zeta)$
7: $u^{(\cdot)A} = a \times u^{(\cdot)A}$ ▷mod q
8: $a_0^{(\cdot)A} = u^{(\cdot)A} - \gamma$
9: return $a_1$, $a_0^{(\cdot)A}$ A description of auxiliary variables and functions used in the functions described herein is now provided.

q: modulus. It is equal to $q=2^{23}-2^{13}+1$ for Dilithium.

γ: low-order rounding range. It is equal to $$\frac{(q-1)}{32}$$

for Dilithium's NIST security levels 3 and 5, and equal to $$\frac{(q-1)}{88}$$

for NIST security level 2.

α: decomposition base. It is equal to 2γ.

$\alpha^{-1}$: multiplicative inverse of α.

ζ: additive inverse of $\alpha^{-1}$.

n: number of bits in ζ if ζ is a power of 2 i.e. $\zeta=2^n$.

$n_s$: The number of Boolean or arithmetic shares used in the sharing of the secret coefficient. Increasing this value will improve the side-channel security, but also lower the performance of the algorithm.

A2B: This function converts $n_s$ arithmetic shares $x^{(\cdot)A} \in \mathbb{Z}_q^{n_s}$ to $n_s$ Boolean shares $x^{(\cdot)B} \in \mathbb{F}_{2^\omega}^{n_s}$, which encode the same secret coefficient $x \in \mathbb{Z}_q$.

$B2A_\zeta$: This function converts $n_s$ Boolean shares $x^{(\cdot)B} \in \mathbb{F}_{2^\omega}^{n_s}$ to $n_s$ arithmetic shares $x^{(\cdot)A} \in \mathbb{Z}_\zeta^{n_s}$, which encode the value of the secret coefficient modulus ζ.

∧: The function computes the bit-wise AND of two inputs. In a Boolean masking context, if one of the inputs is a constant or a public value, the ∧ operation is applied on each share of the other input independently.

>>: The function computes the bit-wise right shift of the input bitstring. In a Boolean masking context, the >> operation is applied on each share of the other input independently.

¬: The function computes the bit-wise negation of the input bitstring. When applied to a Boolean-shared input only one share has to be negated, because ¬(P⊕Q)=(¬P)⊕Q.

+/−: The function computes arithmetic addition or subtraction of the inputs. When applied to one arithmetically-shared input and one public input only one share has to be included in the addition or subtraction, because (P+Q)+R=P+(Q+R).

×: The function computes arithmetic multiplication of the inputs. In an arithmetic masking context, if one of the inputs is a constant or a public value, the × operation is applied on each share of the other input independently.

The disclosed decomposition functions will now be compared to SecDecomposeOriginal. One of the disadvantages of using SecDecomposeOriginal is that it requires $138n_s$ random bits to mask constant public values. The fact that these values are masked also increases the number of operations because these masked values are inputs to additions over Boolean shares which are costly operations.

A comparison of the number of operations required for SecDecomposeA2Apow2 and SecDecomposeA2Bpow2 will now be made. Let $n_s$ be the number of Boolean or arithmetic shares, ω be the word length of the processor (usually 32 or 64 bit), and l=log ω−1. Additionally, define $n_f$ to be the number of operations for a function $f$.

The number of operations required for the elementary functions are provided in Table 1 and the number of operations required for SecDecomposeA2Apow2, SecDecomposeA2Bpow2 and SecDecomposeOriginal are provided in Table 2. The cost of the B2A conversion required for $a_0$ in Dilithium following SecDecomposeOriginal and SecDecomposeA2Bpow2 are not included.

TABLE 1

Number of operations for different functions.

| Function | Number of Operations |
|---|---|
| +, −, ¬, ⊕ | 1 |
| ∧, ×, >> | $n_s$ |
| A2B | $n_s^3\left(\frac{17}{2}l+7\right)-n_s^2(12l+4)+n_s\left(\frac{11}{2}l-3\right)-2l$ |
| SecAnd | $\frac{7n_5^2-5n_s}{2}$ |
| SecOr | $n_{SecAnd}+3$ |
| SecAdd | $l(2n_{SecAnd}+3n_s+2)+2n_{SecAnd}+6n_s$ |

TABLE 2

Number of operations for SecDecomposeA2Apow2, SecDecomposeA2Bpow2 and SecDecomposeOriginal.

| Function | Number of Operations |
|---|---|
| SecDecomposeA2A | $n_{A2B}+4n_s+4$ |
| SecDecomposeA2B | $n_{A2B}+n_{SecAdd}+4n_s+2$ |
| SecDecomposeOriginal | $n_{A2B}+9n_{SecAdd}+3n_{SecAnd}+11n_s+6$ |

Next, the number of random bits that need to be generated in the original algorithm versus the new decomposition functions are compared. SecDecomposeOriginal generates a lot of random bits to mask public values in order to perform masked additions straightforwardly. In SecDecomposeA2Apow2 no masking of public values is required and only SecDecomposeA2Bpow2 requires randomness to mask the constant public value γ+1 to perform a masked addition.

The comparative results are summarized in Tables 3 and 4. There, $r_f$ denotes the number of random bits for a function $f$.

TABLE 3

Number of random bits for different functions.

| Function | Number of Random Bits |
|---|---|
| SecAnd, SecOr | $\frac{\omega}{2}\left(n_s^2-n_s\right)$ |
| SecAdd | $\omega(l+1)(n_s^2-n_s)$ |
| A2B | $n_s^3\omega\left(\frac{3}{2}l+1\right)-n_s^2\omega(3l+1)+\frac{3}{2}ln_s\omega$ |

TABLE 4

Number of random bits for SecDecomposeA2Apow2, SecDecomposeA2Bpow2 and SecDecomposeOriginal.

| Function | Number of Random Bits |
|---|---|
| SecDecomposeA2Apow2 | $r_{A2B}$ |
| SecDecomposeA2Bpow2 | $r_{A2B} + r_{SecAdd} + 23n_s$ |
| SecDecomposeOriginal | $r_{A2B} + 9r_{SecAdd} + 3r_{SecAnd} + 138n_s$ |

The calculations illustrated in Tables 1-4 illustrate that the disclosed decomposition functions reduce the number of operations and random bits needed to perform the decomposition function.

The countermeasures that result from using the implementation of the decomposition functions disclosed herein provide a technological advantage over the prior art that requires fewer calculations and the generation of fewer random bits than prior implementations. This will allow for lattice based post-quantum cryptography schemes to be implemented in more applications that have limited processing resources.

FIG. 1 illustrates an exemplary hardware diagram 100 for implementing masked polynomial decomposition by using the functions SecDecomposeA2Apow2, SecDecomposeA2Bpow2, and SecDecomposeA2Anotpow2. As illustrated, the device 100 includes a processor 120, memory 130, user interface 140, network interface 150, and storage 160 interconnected via one or more system buses 110. It will be understood that FIG. 1 illustrates an exemplary hardware diagram for implementing masked polynomial decomposition by using the functions SecDecomposeA2Apow2, SecDecomposeA2Bpow2, and SecDecomposeA2Anotpow2.

The processor 120 may be any hardware device capable of executing instructions stored in memory 130 or storage 160 or otherwise processing data. As such, the processor may include a microprocessor, microcontroller, graphics processing unit (GPU), field programmable gate array (FPGA), application-specific integrated circuit (ASIC), or other similar devices. The processor may be implemented as a secure processor or may include both a secure processor and unsecure processor.

The memory 130 may include various memories such as, for example L1, L2, or L3 cache or system memory. As such, the memory 130 may include static random-access memory (SRAM), dynamic RAM (DRAM), flash memory, read only memory (ROM), or other similar memory devices.

The user interface 140 may include one or more devices for enabling communication with a user as needed. For example, the user interface 140 may include a display, a touch interface, a mouse, and/or a keyboard for receiving user commands. In some embodiments, the user interface 140 may include a command line interface or graphical user interface that may be presented to a remote terminal via the network interface 150.

The network interface 150 may include one or more devices for enabling communication with other hardware devices. For example, the network interface 150 may include a network interface card (NIC) configured to communicate according to the Ethernet protocol or other communications protocols, including wireless protocols. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate. For example, the storage 160 may store a base operating system 161 for controlling various basic operations of the hardware 100. The storage 162 may include instructions for implementing masked polynomial decomposition by using the functions SecDecomposeA2Apow2, SecDecomposeA2Bpow2, and SecDecomposeA2Anotpow2 described above.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the host device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. Further, where the device 100 is implemented in a cloud computing system, the various hardware components may belong to separate physical systems. For example, the processor 120 may include a first processor in a first server and a second processor in a second server.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A data processing system comprising instructions embodied in a non-transitory computer readable medium, the instructions for a cryptographic operation including a masked decomposition of a polynomial a having $n_s$ arithmetic shares into a high part $a_1$ and a low part $a_0$ for lattice-based cryptography in a processor, the instructions, comprising:

performing a rounded Euclidian division of the polynomial a by a base $\alpha$ to compute $t^{(\cdot)A}$;

extracting Boolean shares $a_1^{(\cdot)B}$ from n low bits of t by performing an arithmetic share to Boolean share (A2B) conversion on $t^{(\cdot)A}$ and performing an AND with $\zeta-1$, where $\zeta=-\alpha^{-1}$ is a power of 2;

unmasking $a_1$ by combining Boolean shares of $a_1^{(\cdot)B}$;

calculating arithmetic shares $a_0^{(\cdot)A}$ of the low part $a_0$; and performing a cryptographic function using $a_1$ and $a_0^{(\cdot)A}$.

2. The data processing system of claim 1, wherein performing a rounded Euclidian division of the polynomial a by a base $\alpha$ to compute $t^{(\cdot)A}$ includes adding $\alpha/2$ to $a^{(\cdot)A}$ and dividing by $\alpha$.

3. The data processing system of claim 2, wherein performing a rounded Euclidian division of the polynomial a by a base $\alpha$ to compute $t^{(\cdot)A}$ includes calculating:

$$t^{(\cdot)A}=a^{(\cdot)A}+\gamma; \text{ and}$$

$$t^{(\cdot)A}=\alpha^{-1}\times t^{(\cdot)A}-(q \bmod \zeta),$$

where $\gamma=\alpha/2$ and q is a prime modulus.

4. The data processing system of claim 1, wherein calculating arithmetic shares $a_0^{(\cdot)A}$ of the low part $a_0$ includes:

calculating $u^{(\cdot)A}$ by subtracting $a_1$ from $t^{(\cdot)A}$ and adding q mod $\zeta$, where q is a prime modulus; and multiplying $u^{(\cdot)A}$ by $\alpha$ and then subtracting $\alpha/2$.

5. A data processing system comprising instructions embodied in a non-transitory computer readable medium, the instructions for a cryptographic operation including a masked decomposition of a polynomial a having $n_s$ arithmetic shares into a high part $a_1$ and a low part $a_0$ for lattice-based cryptography in a processor, the instructions, comprising:

performing a rounded Euclidian division of the polynomial a by a base $\alpha$ to compute $t^{(\cdot)A}$;

extracting Boolean shares $a_1^{(\cdot)B}$ from n low bits of t by performing an arithmetic share to Boolean share (A2B) conversion on $t^{(\cdot)A}$ and performing an AND with $\zeta-1$, where $\zeta=-\alpha^{-1}$ is a power of 2;

unmasking $a_1$ by combining Boolean shares of $a_1^{(\cdot)B}$;

calculating the Boolean shares $a_0^{(\cdot)B}$ of the low part $a_0$; and performing a cryptographic function using $a_1$ and $a_0^{(\cdot)B}$.

6. The data processing system of claim 5, wherein performing a rounded Euclidian division of the polynomial a by a base $\alpha$ to compute $t^{(\cdot)A}$ includes adding $\alpha/2$ to $a^{(\cdot)A}$ and dividing by $\alpha$.

7. The data processing system of claim 6, wherein performing a rounded Euclidian division of the polynomial a by a base $\alpha$ to compute $t^{(\cdot)A}$ includes calculating:

$$t^{(\cdot)A}=a^{(\cdot)A}+\gamma; \text{ and}$$

$$t^{(\cdot)A}=\alpha^{-1}\times t^{(\cdot)A}-(q \bmod \zeta),$$

where $\gamma=\alpha/2$ and q is a prime modulus.

8. The data processing system of claim 5, wherein calculating the Boolean shares $a_0^{(\cdot)B}$ of the low part $a_0$ includes:

shifting $t^{(\cdot)B}$ n bits to the right, where n is a number of bits in $\zeta$; and calculating $$a_0^{(\cdot)B}=\text{SecAdd}(((\gamma+(q \bmod \zeta))^{(\cdot)B}, \neg t^{(\cdot)B})$$

where $\gamma=\alpha/2$ and q is a prime modulus.

9. A data processing system comprising instructions embodied in a non-transitory computer readable medium, the instructions for a cryptographic operation including a masked decomposition of a polynomial a having $n_s$ arithmetic shares into a high part $a_1$ and a low part $a_0$ for lattice-based cryptography in a processor, the instructions, comprising:

performing a rounded Euclidian division of the polynomial a by a base $\alpha$ to compute $t^{(\cdot)A}$;

extracting Boolean shares $a_1^{(\cdot)B}$ from n low bits of t by performing an arithmetic share to Boolean share (A2B) conversion on $t^{(\cdot)A}$ to produce $t^{(\cdot)B}$ and performing a Boolean share to arithmetic share (B2A) conversion on $t^{(\cdot)B}$, where $\zeta=-\alpha^{-1}$;

unmasking $a_1$ by combining arithmetic shares of $a_1^{(\cdot)A}$;

calculating the arithmetic shares $a_0^{(\cdot)A}$ of the low part $a_0$; and performing a cryptographic function using $a_1$ and $a_0^{(\cdot)A}$.

10. The data processing system of claim 9, wherein performing a rounded Euclidian division of the polynomial a by a base $\alpha$ to compute $t^{(\cdot)A}$ includes adding $\alpha/2$ to $\alpha^{(\cdot)A}$ and dividing by $\alpha$.

11. The data processing system of claim 10, wherein performing a rounded Euclidian division of the polynomial a by a base $\alpha$ to compute $t^{(\cdot)A}$ includes calculating:

$$t^{(\cdot)A}=a^{(\cdot)A}+\gamma; \text{ and}$$

$$t^{(\cdot)A}=\alpha^{-1}\times t^{(\cdot)A}-(q \bmod \zeta),$$

where $\gamma=\alpha/2$ and q is a prime modulus.

12. The data processing system of claim 9, wherein calculating the arithmetic shares $a_0^{(\cdot)A}$ of the low part $a_0$ includes:

calculating $u^{(\cdot)A}$ by subtracting $a_1$ from $t^{(\cdot)A}$ and adding q mod $\zeta$, where q is a prime modulus; and multiplying $u^{(\cdot)A}$ by $\alpha$ and then subtracting $\alpha/2$.

* * * * *